Patented Dec. 22, 1942

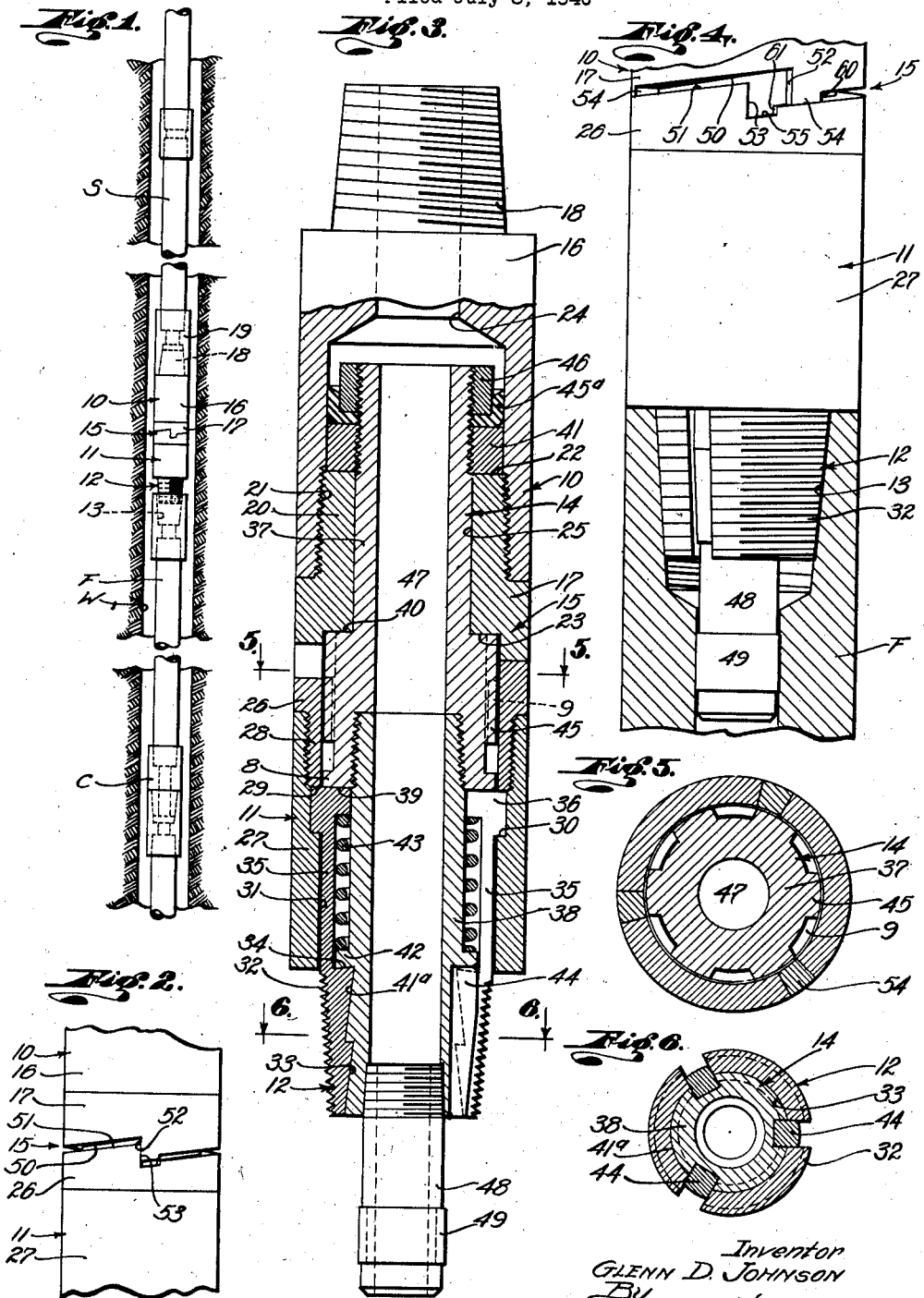

2,305,709

UNITED STATES PATENT OFFICE 2,305,709

RELEASABLE PIN TAP

Glenn D. Johnson, Compton, Calif., assignor to Baash-Ross Tool Company, Los Angeles, Calif., a corporation of California Application July 8, 1940, Serial No. 344,349

14 Claims. (Cl. 294—86)

This invention relates to a well tool and relates more particularly to a tool for facilitating the recovery of objects from wells. A general object of this invention is to provide an effective, dependable and easily controlled pin tap useful in recovering objects from wells and in backing off or unthreading portions of pipe, etc. that are caught in wells.

In the drilling of deep wells drilling tools and equipment are sometimes caught in the well and cannot be withdrawn by the usual methods. For example, a string of pipe sometimes becomes caught in a well and cannot be pulled free. When attempts to remove a string of pipe have failed the pipe is usually rotated in the mouth of the well to unthread at least a portion of the string for immediate removal. This leaves a portion of the pipe string in the well. In many instances the conditions are such that it is impossible or impractical to engage a tool over the remaining portion of the pipe for the purpose of recovering the fish and it becomes necessary to engage the interior of the fish or pipe with a tap or like fishing tool.

Another object of this invention is to provide a tap useful for recovering objects from wells that may be readily engaged or threaded in the fish for the purpose of pulling the fish from the well or to facilitate the unthreading of a portion of the fish and which may be easily released from the fish in the event the fish cannot be pulled free or released by the unthreading operations.

Another object of this invention is to provide a fishing tap of the character mentioned that includes a set of slips threaded to mate with the socket or box of the fish and adapted to be easily threaded in the socket or box when in a contracted state and then expanded to firmly and positively engage in the box so that a lifting force and/or a turning force may be applied to the fish to withdraw the fish or to unthread the fish, the expanded slips providing a strong, dependable, tension transmitting connection and dependably resisting unthreading so that torque may be applied to the fish to unthread its sections.

Another object of this invention is to provide a pin tap of the character mentioned embodying a novel control for the expansible and contractible slips that assures the easy release of the tool from the fish in the event the fish cannot be pulled free or backed off.

Another object of this invention is to provide a releasable pin tap in which the control for the slips is fully operated by simple manipulations of the fishing string which do not endanger, strain, or unthread the connections of the fishing string.

Another object of this invention is to provide a releasable pin tap embodying means for delivering or conducting fluid to the fish so that circulation may be established through the fish to assist in freeing the same.

A further object of this invention is to provide a releasable pin tap that is sturdy and compact and simple and inexpensive to manufacture.

The various objects and features of my invention will be fully understood from the following detailed description of a typical, preferred form and application of the invention, throughout which description reference is made to the accompanying drawing, in which:

Fig. 1 is a fragmentary sectional view of a well showing the pin tap of the present invention about to enter a fish in the well. Fig. 2 is an enlarged fragmentary side elevation of the pin tap showing the control in a partially operated condition. Fig. 3 is an enlarged longitudinal detailed sectional view of the tool of the invention. Fig. 4 is an enlarged fragmentary side elevation of the tool showing the control in the fully actuated condition and illustrating the slips engaged in the fish, the fish appearing in vertical cross section. Fig. 5 is a transverse detailed sectional view taken as indicated by line 5—5 on Fig. 3 and Fig. 6 is a transverse detailed sectional view taken as indicated by line 6—6 on Fig. 3.

The well tool of the present invention may be said to comprise, generally, an upper body member 10 adapted to be attached to the lower end of a fishing string S, a lower body member 11, tap parts or slips 12 to be engaged in the threaded socket 13 of a fish F, a mandrel 14 extending through the members 10 and 11 operable to expand the slips 12, and a control 15 for governing the expansion and contraction of the slips 12.

The body member 10 is the upper part of the tool body and is intended to be connected to the lower end of the fishing string S. The member 10 comprises a sub or upper section 16 and a lower section 17. The upper section 16 is formed for ready connection with the string S. In the construction illustrated a tapered pin 18 on the upper end of the section 16 is threaded into a coupling member or sub 19 on the lower end of the string S. Where the object or fish F to be withdrawn from the well is made up of parts or sections connected by righthand threads the fishing string S is made up with lefthand threads and the threads of the pin 18 and the sub 19 are lefthanded. In the event the fish F embodies sections coupled by lefthand threads the connections of the string S and the pin 18 and sub 19 carry righthand threads. The lower section 17 is rigidly secured to the upper section 16. In the preferred construction illustrated a pin 20 on the upper end of the section 17 is threaded into a socket 21 in the lower end of the section 16. The threads of the pin 20 and 21 are pitched in the same direction as the threads of the pin 18 and the sub 19. The upper end of the pin 20 forms an upwardly facing annular shoulder 22 in the upper body member 10 and the section 17 is formed to present a downwardly facing internal annular shoulder 23. A fluid passage 24 extends downwardly through the section 16 from the upper end of its pin 18 and the section 17 is provided with a central vertical opening 25.

The lower body member 11 is a tubular assembly arranged at the lower end of the member 10. The lower body member 11 comprises an upper part 26 and a lower part 27. In the construction illustrated a pin 28 on the lower end of the part 26 is threaded into a socket in the upper end of the part 27. The threads of the pin 28 and the socket are pitched in the same direction as the threads of the pin 18 and sub 19. The lower end of the pin 28 forms a downwardly facing annular shoulder 29 in the member 11. The lower part 27 has an upwardly facing annular shoulder 30 spaced below the shoulder 29. A central vertical opening 31 extends through the lower body member 11. The lower end of the body member 11 is preferably flat and horizontal and is adapted to cooperate with the upper end of the fish F.

The slips 12 are provided to engage in the box or socket 13 of the fish F and are expansible by the mandrel 14 to obtain a firm hold or grip in the socket 13 and thus connect the tool and string S with the fish. There is a plurality or series of like slips 12 arranged at the lower end of the body member. The slips 12 are arranged in an annular series and are preferably spaced apart. The outer sides of the slips 12 are tapered and carry thread parts 32 to mate with the thread in the socket 13. The series of slips 12 forms a "pin," shaped and proportioned to readily thread in the socket 13 and the slips are constructed and arranged so that the "pin" is slightly smaller in diameter than the socket 13 to better thread in the socket. The inner sides of the slips 12 have series of inclined surfaces 33. The surfaces 33 are preferably, though not necessarily, frustrums of cones. The inner ends of the uppermost surfaces 33 terminate in upwardly and inwardly sloping shoulders 34. The slips 12 are arranged below the lower end of the body member 11 and reins or shanks 35 are provided on the upper ends of the slips to extend upwardly in the opening 31. The upper ends of the shanks 35 carry heads 36. In practice the heads 36 are integral with the shanks 35 and fit one between the other to form a sectional ring or annular assembly. The heads 36 are received between the shoulders 29 and 30 so that the set of slips 12 is held against longitudinal movement with respect to the lower body member 11. The resiliency of the slip shanks 35 normally holds the slips 12 retracted and serves to return the slips to their normal contracted positions after expansion.

The mandrel 14 extends longitudinally through the lower body member 11 and continues upwardly into the upped body member 10. In the preferred construction the mandrel 14 is an elongate tubular structure and is sectional to facilitate the assembly of the device. In the construction illustrated the mandrel 14 includes an upper section 37 and a lower section 38 threaded into the lower end of the upper section. The lower end of the section 37 forms a downwardly facing shoulder 39 substantially flush with the shoulder 29. An annular upwardly facing shoulder 40 is provided on the mandrel section 37 to oppose and engage the shoulder 23. A nut 41 is threaded on the upper portion of the mandrel section 37 and engages the shoulder 22. The engagement of the shoulder 40 with the shoulder 23 holds the mandrel against upward movement while the engagement of the nut 41 with the shoulder 22 holds the mandrel against downward movement so that the mandrel moves longitudinally with the upper body member 10. The lower mandrel section 38 passes downwardly through the series of slip heads 36 and through the series of slips 12.

Sets of slip actuating surfaces 41ª are formed on the lower portion of the mandrel section 38. The surfaces 41ª are complementary to the surfaces 33, and are operable upon upward movement of the mandrel 14 to expand the slips 12. An annular flange 42 is provided at the upper ends of the series of surfaces 41 and has a downwardly and outwardly sloping lower face. The engagement of the sloping slip shoulders 34 with the sloping face of the flange 42 aids in releasably holding the slips 12 retracted. A coiled spring 43 surrounds the mandrel section 38 and is arranged under compression between the flange 42 and the lower sides of the heads 36. The spring 43 normally supports the slips 12 in raised positions where they are retracted. The spring 43 further serves to support the body member 11 in its normal position, the shoulder 29 resting on the slip heads 36 to transmit the weight of the member 11 to the heads 36.

The slips 12 are non-rotatably connected with the mandrel 14 so that torque may be transmitted from the mandrel to the slips. Keys 44 are provided on the mandrel section 38 to engage between the slips 12. In practice the keys 44 may be welded or otherwise secured in longitudinal grooves in the lower portion of the mandrel section 38. The outer edges of the keys 44 preferably slope downwardly and inwardly. A spline connection or torque transmitting connection is provided between the mandrel 14 and the lower body member 11 to allow limited longitudinal movement of the member 11 relative to the mandrel. Splines 45 are formed on the mandrel section 37 and slidably cooperate with splines 9 on the part 26 to hold the body member 11 and the mandrel 14 against relative turning. The splines 45 extend downwardly from the shoulder 40 and terminate some distance above the shoulder 39. An outwardly projecting rim or flange 8 is formed on the mandrel section 37 at the shoulder 39. The splines 9 are shorter than the splines 45 and have their upper ends spaced from the top of the member 11 and their lower ends normally spaced above the flange 42. The lower ends of the splines 9 are engageable with the flange 8 to limit the downward movement of the body member 11 relative to the mandrel 14 and member 10.

It will be observed that the mandrel 14 and the upper body member 10 are related for relative turning movement while the mandrel 14 and the lower body member 11 are related for limited relative longitudinal movement and are connected against relative turning.

Means is associated with the mandrel 14 to assure the delivery of fluid under pressure to the interior of the fish F. A cup washer or sealing element 45ᵃ is arranged on the nut 41 to seal with the interior of the upper body member 10. A clamp nut 46 is threaded on the mandrel section 37 to hold the sealing element 45 in place. The central longitudinal opening 47 of the tubular mandrel 14 receives the fluid under pressure from the passage 24 of the body member 10. A wash pipe 48 is associated with the lower end of the mandrel 14 to discharge the fluid into the fish F. In practice the wash pipe 48 may be threaded in the lower end of the mandrel section 38. The wash pipe 48 is proportioned to freely enter the fish F and carries a packer 49 for sealing with the interior of the fish.

The control 15 is such that simple manipulation of the fishing string S serves to expand the slips 12, to hold the slips expanded and to contract or permit contraction of the slips. The control 15 includes cooperating parts on the opposing ends of the body members 10 and 11. The lower end of the section 17 has a series of sloping or helicoidally pitched surfaces 50 and the upper end of the part 26 has a corresponding number of complementary pitched surfaces 51. The upper ends or the high ends of the surfaces 50 terminate in vertical shoulders 52 and complementary shoulders 53 occur at the high ends of the surfaces 51. The shoulders 52 face in a clockwise direction and are opposed by the shoulders 53 which face in a counterclockwise direction. Downwardly projecting lugs 54 are provided on the lower end of the section 17 at the shoulders 52 and notches 55 are formed in the upper end of the part 26 at the bases of the shoulders 53 to receive the lugs 54. With the lugs 54 engaged in the notches 55 the surfaces 50 mate with the surfaces 51 as illustrated in Fig. 1. The parts are related so that the slips 12 are contracted, with the shoulders 34 at the flange 42, when the lugs 54 are received in the notches 55. The lower ends of the lugs 54 and the bottom walls of the notches 55 have the same pitch as the surfaces 50 and 51. When the upper body member 10 is raised and turned in a counterclockwise direction with respect to the lower body member 11 the lugs 54 are raised out of the notches 55 and the lower ends of the lugs 54 are made to bear on or engage the surfaces 51. This engagement may serve to transmit torque or rotation from the body member 10 to the body member 11. The play or clearance between the lower ends of the splines 9 and the flange 8 allows for the raising of the member 11 as just described and the engagement of the splines 9 with the flange 8 limits upward movement of the member 10 relative to the member 11 before the said counterclockwise turning of the member 11 moves the lugs 54 from the surfaces 51.

It will be assumed that the fish F to be recovered from the well W is made up of sections connected by couplings C having righthand threads. The releasable pin tap of the invention is secured to the lower end of a string S provided with lefthand threads as above described. The tool is run into the well on the string S and brought to a position where the series of slips 12 may enter the socket 13. With the slips 12 entered in the socket 13 the fishing string S is turned to the right to thread the set of slips in the threaded socket 13. At this time the slips 12 are in their contracted condition and the lugs 54 are engaged in the notches 55. The shoulders 52 engaged with the shoulders 53 transmit righthand rotation from the body member 10 to the body member 11 and this rotation is transmitted through the splines 9 and 45, the mandrel 14 and the keys 44 to the slips 12. In practice the slips 12 may be readily threaded in the socket 13 without subjecting the string S or the threaded connections of the tool to any appreciable torque and there is no danger of disconnecting or loosening the threaded joints of the string or tool. Threading of the slips 12 in the socket 13 brings the lower end of the body member 11 against the upper end of the fish F. When the set of slips 12 has been threaded in the socket 13 the string S is raised or put under tension. This moves the body member 10 and the mandrel 14 upwardly relative to the lower body member 11 and the slips 12. The slips being threaded in the socket 13 serve to hold the body section 11 against upward movement. Upward movement of the body member 10 with respect to the member 11 moves the lugs 54 upwardly out of the notches 55 and may bring the lower ends of the lugs into alignment with the surfaces 51. Fig. 2 of the drawing illustrates this condition. With the tension maintained on the fishing string S the string is turned to the left to move the lugs 54 out of vertical alignment with their notches 55. Lefthand turning of the string S brings the lower ends of the lugs 54 into binding engagement or frictional cooperation with the pitched surfaces 51.

Upward movement of the string S to raise the lugs 54 from the notches 55, as above described, causes expansion of the slips 12. The mandrel 14 moves upwardly with the body member 10 and the flange 42 moves out of holding engagement with the shoulders 34 and the inclined surfaces 41 cooperate with the surfaces 33 to expand the slips 12. The slips 12 expanded in the socket 13 securely connect the tool with the fish F. The frictional engagement of the lugs 54 with the surfaces 51 resulting from the lefthand turning of the string S holds or locks the slips 12 in the expanded state. So long as the lefthand torque is retained on the string S to hold the lugs 54 in frictional contact with the surfaces 51 the string S may be raised and lowered in an attempt to pull free or work loose the fish F. If the fish F is freed by these operations it is, of course, removed from the well on the string S. Circulation fluid or water may be pumped through the string S to discharge from the wash pipe 48 into the fish and if circulation is established through the fish the fish may be more readily freed.

In the event the fish F cannot be pulled loose it may be found desirable to back off or unthread a portion of the fish for removal from the well. With the slips 12 expanded in the socket 13 and with the control 15 actuated as illustrated in Fig. 4, the string S is rotated to the left to unthread or back off a portion of the fish F. The lugs 54 frictionally engaging the surfaces 51 transmit the lefthand rotation to the lower body member 11, the splines 9 and 45 transmit the rotation to the mandrel 14 and the keys 44 on the mandrel transmit the rotation to the expanded slips 12. The expanded slips tightly engaged in the socket 13 effectively transmit the lefthand rotation to the fish F and a substantial lefthand torque may be applied to the fish without danger of loosening the slips. The lefthand torque applied to the fish F usually loosens one of the connections C and the string S may be turned to the left to unthread the connection and thus free an upper portion of the fish F. The freed upper portion of the fish may be removed from the well on the string S.

In the event a portion of the string cannot be unthreaded or backed off, as just described, the pin tap is released from the fish. To release the pin tap the string S is turned to the right to engage the shoulders 52 with the shoulders 53 and thus bring the lugs 52 into vertical alignment with their notches 55 and the string is then lowered. Downward movement of the string S moves the lugs 54 into the notches 55 and moves the surfaces 41 downwardly with respect to the slips 12. Downward movement of the surfaces 41 is accompanied by retraction of the slips 12 and the retracted slips are readily unthreaded from the socket 13 by lefthand rotation of the string S. This lefthand rotation is transmitted from the body member 10 to the body member 11 through the engaging shoulders 60 and 61. When the slips 12 have been unthreaded from the socket 13 the pin tap may be withdrawn from the well on the string S.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A well tool for engaging in an object in a well comprising a set of slips for entering the object, a mandrel, wedge parts on the mandrel operable upon vertical movement of the mandrel to expand the slips in the object, means carrying the mandrel and slips for relative vertical movement whereby the slips may be expanded and allowed to contract, and inclined plane means operable by turning movement of said means to provide frictional engagement for retaining the mandrel in the position where the slips are expanded.

2. A well tool for engaging in the threaded socket of an object in a well comprising two elements, one a body section, the other a mandrel connected with the body section for vertical movement therewith, the elements being related for relative turning movement, slips to be entered in the socket, parts on the mandrel operable to expand the slips in the socket upon vertical movement of the body section and mandrel, and a control operable by turning of the body section relative to the mandrel to lock the slips in the expanded condition and to release the slips for contraction, the control including an inclined surface on one element and a part on the other element for frictionally engaging said surface upon said turning of the body section.

3. A well tool for engaging in the threaded socket of an object in a well comprising a body section, a mandrel connected with the body section for vertical movement therewith, the body section and mandrel being related for relative turning movement, slips to be entered in the socket, parts on the mandrel operable to expand the slips in the socket upon vertical movement of the body section and mandrel, and inclined plane means on the body section and mandrel operable by turning of the section relative to the mandrel to releasably lock the mandrel in the position where the slips are expanded.

4. A well tool for engaging in the threaded socket of an object in a well comprising an upper member, a mandrel connected with the upper member for vertical movement therewith, the member and mandrel being related for relative turning, a lower member non-rotatably connected with the mandrel and shiftable with respect to the upper member, slips carried by the lower member, means for transmitting rotation from the mandrel to the slips, wedge parts on the mandrel for expanding the slips in the socket when the mandrel is moved upwardly relative to the lower member, and a control for holding the mandrel elevated and the slips expanded releasable by turning and downward movement of the upper member.

5. A well tool for engaging in the threaded socket of an object in a well comprising an upper member, a mandrel connected with the upper member for vertical movement therewith, the member and mandrel being related for relative turning, a lower member non-rotatably connected with the mandrel and shiftable with respect to the upper member, slips carried by the lower member, means for transmitting rotation from the mandrel to the slips, wedge parts on the mandrel for expanding the slips in the socket when the mandrel is moved upwardly relative to the lower member, and a control for holding the mandrel elevated and the slips expanded releasable by turning and downward movement of the upper member, said control including cooperating inclined plane elements on the upper and lower members.

6. A releasable pin tap for engaging the threaded socket of an object in a well and operable by a well string comprising a body member to be secured to the string, a lower body part, slips carried by the lower body part to be threaded in the socket, a mandrel rotatably connected with the body member and shiftably connected with the body part to turn therewith, the mandrel being movable vertically with the body member, wedge parts on the mandrel for expanding the slips in the socket upon upward movement of the body member following threading of the slips in the socket, and a control including shoulders on the body member and body part for transmitting rotation whereby the slips may be threaded into and out of the socket when the slips are contracted.

7. A releasable pin tap for engaging the threaded socket of an object in a well and operable by a well string comprising a body member to be secured to the string, a lower body part, slips carried by the lower body part to be threaded in the socket, a mandrel rotatably connected with the body member and shiftably connected with the body part, the mandrel being movable vertically with the body member, wedge parts on the mandrel for expanding the slips in the socket upon upward movement of the body member following threading of the slips in the socket, and a control including shoulders on the body member and body part for transmitting rotation whereby the slips may be threaded into and out of the socket, and sloping surfaces on the body member and body part engaged by turning of the body member following threading of the slips in the socket and serving to transmit torque whereby the object may be backed off by rotation of the string, said surfaces being released by reverse turning of the string.

8. A releasable pin tap for engaging the threaded socket of an object in a well and operable by a well string comprising a body member to be secured to the string, a lower body part, slips carried by the lower body part to be threaded in the socket, a mandrel rotatably connected with the body member and shiftably connected with the body part, the mandrel being movable vertically with the body member, wedge parts on the mandrel for expanding the slips in the socket upon upward movement of the body member following threading of the slips in the socket, and a control comprising walls on the body part defining a notch, a lug on the body member engaging in the notch whereby the body member may be turned to thread the slips in the socket and released from the notch when the body member is moved to expand the slips, and a sloping surface on the body engageable by the lug upon turning of the body member to transmit said turning so that the object may be backed off by turning of the string.

9. A releasable pin tap for engaging the threaded socket of an object in a well and operable by a well string comprising a body member to be secured to the string, a lower body part, slips carried by the lower body part to be threaded in the socket, a mandrel rotatably connected with the body member and shiftably connected with the body part, the mandrel being movable vertically with the body member, wedge parts on the mandrel for expanding the slips in the socket upon upward movement of the body member following threading of the slips in the socket, and a control operable by turning of the body member following expansion of the slips for holding the slips expanded.

10. A releasable pin tap for engaging the threaded socket of an object in a well and operable by a well string comprising a body member to be secured to the string, a lower body part, slips carried by the lower body part to be threaded in the socket, a mandrel rotatably connected with the body member and shiftably connected with the body part, the mandrel being movable vertically with the body member, wedge parts on the mandrel for expanding the slips in the socket upon upward movement of the body member following threading of the slips in the socket, and a control operable by turning of the body member following expansion of the slips for holding the slips expanded, the control including engageable sloping surfaces on the body member and body part preventing relative vertical movement between the body member and body part.

11. A releasable pin tap for engaging the threaded socket of an object in a well and operable by a well string comprising a body member to be secured to the string, a lower body part, slips carried by the lower body part to be threaded in the socket, a mandrel rotatably connected with the body member and shiftably connected with the body part, the mandrel being movable vertically with the body member, wedge parts on the mandrel for expanding the slips in the socket upon upward movement of the body member following threading of the slips in the socket, and a control operable by turning of the body member following expansion of the slips for holding the slips expanded, and releasable by reverse rotation of the body member to allow contraction of the slips, the control including a notch in the body part, a lug on the body member engaged in the notch for the transmission of rotation in both directions and released from the notch by said upward movement of the body member, and a sloping surface on the body part engaged by the lug upon turning of the body member to latch the slips expanded, the lug being released from the sloping surface by reverse turning of the body member.

12. A releasable pin tap for engaging the threaded socket of an object in a well and operable by a well string comprising a body member to be secured to the string, a lower body part, slips carried by the lower body part to be threaded in the socket, means yieldingly holding the slips contracted, a mandrel rotatably connected with the body member and shiftably connected with the body part, the mandrel being movable vertically with the body member, wedge parts on the mandrel for expanding the slips in the socket upon upward movement of the body member following threading of the slips in the socket, and a control including shoulders on the body member and body part for transmitting rotation whereby the slips may be threaded in the socket.

13. A releasable pin tap for engaging the threaded socket of an object in a well and operable by a well string comprising a body member to be secured to the string, a lower body part, slips carried by the lower body part to be threaded in the socket, a mandrel rotatably connected with the body member and shiftably connected with the body part, the mandrel being movable vertically with the body member, wedge parts on the mandrel for expanding the slips in the socket upon upward movement of the body member following threading of the slips in the socket, a wash pipe on the mandrel for discharging fluid into the object, and a control including shoulders on the body member and body part for transmitting rotation whereby the slips may be threaded in the socket.

14. A releasable pin tap for engaging the threaded socket of an object in a well and operable by a well string comprising a body member to be secured to the string, a lower body part, slips carried by the lower body part to be threaded in the socket, a mandrel rotatably connected with the body member and shiftably connected with the body part, the mandrel being movable vertically with the body member, wedge parts on the mandrel for expanding the slips in the socket upon upward movement of the body member following threading of the slips in the socket, a wash pipe on the mandrel for extending into the fish, a packer on the wash pipe for sealing in the fish, and a control including shoulders on the body member and body part for transmitting rotation whereby the slips may be threaded in the socket.

GLENN D. JOHNSON.